US 7,234,646 B2

(12) United States Patent
Saitoh et al.

(10) Patent No.: US 7,234,646 B2
(45) Date of Patent: Jun. 26, 2007

(54) HEAT PUMP HOT-WATER SUPPLY SYSTEM

(75) Inventors: Kenichi Saitoh, Ohira (JP); Masahiko Gommori, Ohira (JP); Hiroshi Kogure, Sano (JP); Haruko Ashida, Ohira (JP); Takeo Ozawa, Oyama (JP); Tetsunobu Okamura, Ohira (JP)

(73) Assignee: Hitachi Appliances, Inc., Tokyo (JP)

( * ) Notice: Subject to any disclaimer, the term of this patent is extended or adjusted under 35 U.S.C. 154(b) by 0 days.

(21) Appl. No.: 11/097,302

(22) Filed: Apr. 4, 2005

(65) Prior Publication Data

US 2005/0167516 A1 Aug. 4, 2005

Related U.S. Application Data

(60) Continuation of application No. 10/839,213, filed on May 6, 2004, now Pat. No. 6,874,694, which is a division of application No. 10/358,277, filed on Feb. 5, 2003, now Pat. No. 6,837,443.

(30) Foreign Application Priority Data

Mar. 20, 2002 (JP) ............................. 2002-077458

(51) Int. Cl.
*B60H 1/00* (2006.01)
(52) U.S. Cl. .................... 237/2 B; 237/2 A; 62/238.1
(58) Field of Classification Search ............... 237/2 A, 237/2 B; 62/238.1, 238.2, 238.5
See application file for complete search history.

(56) References Cited

U.S. PATENT DOCUMENTS

| 3,984,050 | A | | 10/1976 | Gustafsson | |
|---|---|---|---|---|---|
| 4,091,994 | A | | 5/1978 | Madsen | |
| 4,124,177 | A | * | 11/1978 | Timmerman | ................ 237/2 B |
| 4,209,996 | A | | 7/1980 | Shaw | |
| 4,323,109 | A | * | 4/1982 | Jaster | .......................... 165/45 |
| 4,367,634 | A | * | 1/1983 | Bolton | ...................... 62/238.6 |
| 4,474,169 | A | * | 10/1984 | Steutermann | ............... 126/592 |
| 4,505,328 | A | * | 3/1985 | Schmitt | ....................... 165/53 |
| 4,570,449 | A | | 2/1986 | Knokey et al. | |
| 4,592,206 | A | * | 6/1986 | Yamazaki et al. | ............ 62/160 |
| 4,599,870 | A | | 7/1986 | Hebert et al. | |
| 4,604,872 | A | * | 8/1986 | Miyazaki et al. | ............. 62/156 |
| 4,627,483 | A | * | 12/1986 | Harshbarger et al. | ....... 237/2 A |
| 4,638,943 | A | | 1/1987 | Casier | |
| 4,640,458 | A | | 2/1987 | Casier | |

(Continued)

FOREIGN PATENT DOCUMENTS

JP 59-13834 1/1984

(Continued)

*Primary Examiner*—Derek S. Boles
(74) *Attorney, Agent, or Firm*—Antonelli, Terry, Stout & Kraus, LLP.

(57) ABSTRACT

A hot-water supply system heats water through heat exchange between high-temperature refrigerant of a heat pump circuit and water of a water circulating circuit. The system is an instantaneous water heater unit for instantaneously heating, at a water heat exchanger, water supplied through a water supply pipe and supplying hot water to a using end unit. Therefore, a large-capacity hot-water storage tank is not needed. Sufficient heat of condensation to heat water can not be produced, because pressure conditions of the heat pump circuit is not stabilized just after the start of operation. Therefore, during a short period of rising time, hot water stored in a hot-water supply tank and water from the water heat exchanger are mixed and the mixture is supplied to keep the hot water at a preset temperature. Therefore, it is possible to use a smaller hot-water supply tank.

30 Claims, 4 Drawing Sheets

U.S. PATENT DOCUMENTS

| | | | | |
|---|---|---|---|---|
| 4,796,437 | A | * | 1/1989 | James .......................... 62/79 |
| 4,860,552 | A | * | 8/1989 | Beckey ........................ 62/158 |
| 5,050,396 | A | | 9/1991 | Ohkoshi et al. |
| 5,078,318 | A | | 1/1992 | Kawai et al. |
| 5,086,626 | A | * | 2/1992 | Iida ............................. 62/184 |
| 5,228,302 | A | * | 7/1993 | Eiermann ...................... 62/90 |
| 5,366,153 | A | * | 11/1994 | Swenson ...................... 237/19 |
| 5,367,601 | A | * | 11/1994 | Hannabery .................. 392/307 |
| 5,465,588 | A | * | 11/1995 | McCahill et al. ............. 62/127 |
| 6,149,066 | A | * | 11/2000 | Perry et al. ................. 237/2 B |
| 6,152,217 | A | * | 11/2000 | Ito et al. ..................... 165/202 |
| 6,418,737 | B1 | | 7/2002 | Kuroki |
| 6,601,773 | B2 | | 8/2003 | Saitoh |
| 2004/0144528 | A1 | | 7/2004 | Kunimoto et al. |

FOREIGN PATENT DOCUMENTS

| | | |
|---|---|---|
| JP | 61-36256 | 3/1986 |
| JP | 1-88215 | 6/1989 |
| JP | 01-208661 | 8/1989 |
| JP | 6-313619 | 11/1994 |
| JP | 7-167519 | 7/1995 |
| JP | 8-296895 | 11/1996 |
| JP | 09126547 | 5/1997 |
| JP | 9-310924 | 12/1997 |
| JP | 10-311597 | 11/1998 |
| JP | 11-344258 | 12/1999 |
| JP | 2001-263800 | 9/2001 |
| JP | 2001-280695 | 10/2001 |
| JP | 2001-296051 | 10/2001 |
| JP | 2001-296053 | 10/2001 |
| JP | 2002-39616 | 2/2002 |
| JP | 2002-48401 | 2/2002 |
| JP | 2002-48420 | 2/2002 |
| JP | 2004/264807 | 9/2004 |
| JP | 2004/264808 | 9/2004 |
| JP | 2004/264812 | 9/2004 |

\* cited by examiner

HEAT PUMP HOT-WATER SUPPLY SYSTEM

CROSS REFERENCE TO RELATED APPLICATION

This application is a continuation application of U.S. Ser. No. 10/839,213 filed May 6, 2004 now U.S. Pat. No. 6,874,694 which is a divisional application of U.S. Ser. No. 10/358,277, filed Feb. 5, 2003 now U.S. Pat. No. 6,837,443, the contents of each of which are incorporated hereby by reference.

FIELD OF THE INVENTION

This invention relates to a hot-water supply system utilizing a heat pump circuit.

BACKGROUND OF THE INVENTION

As conventional hot-water supply systems, there have been adopted a combustion-type hot-water supply system and an electric water heating system. The combustion-type hot-water supply system has no hot-water storage tank. In this unit, a gas is burned to instantly heat up water with its high combustion heat to supply hot water. On the other hand, the electric water heating system has a large-capacity hot-water storage tank, in which a large quantity of water heated during the nighttime with an electric water heater by utilizing a low-cost midnight power is held, so that the hot water held in the hot-water storage tank may be used during the daytime.

Recently, however, a heat pump hot-water supply system having a 300 to 500 percent higher energy efficiency than the electric water heating system has come into widespread use. The heat pump hot-water supply system, utilizing changes in the state of the refrigerant as a heat source, has several times higher energy efficiency than the electric water heater. Besides, since no gas combustion takes place, the hot-water supply system produces no $CO_2$, thereby being valued as an eco-friendly system. However, because the quantity of heat produced in the heat pump hot-water supply system is not as great as compared with gas combustion, there is generally adopted such a method that a large-capacity hot-water storage tank is provided, like in the electric water heating system; the hot water heated with a nighttime low-cost electric power by the use of a heat pump circuit is held in a hot-water storage tank during the nighttime, and is used during the daytime. Therefore, in the conventional heat pump hot-water supply system, a heat pump circuit and a hot-water storage tank are separately mounted. The hot water produced by the heat pump circuit is voluminously held in the hot-water storage tank. The heat pump circuit and the hot-water storage tank are connected by a piping, to thereby combinedly function as a hot-water supply system.

There has been conventionally known a heat pump hot-water supply system as an example as disclosed in Japanese Patent Laid-Open No. 1997(H9)-126547. The heat pump hot-water supply system is comprised of a heat pump circuit including a compressor, a condenser, a pressure reducing unit, and an evaporator; and a large-capacity hot-water storage tank. In the unit, a water pipe is connected from under the hot-water storage tank to a water heat exchanger, which functions as the condenser of the heat pump circuit, via a circulating pump; and a heating circuit is constituted by connecting a hot-water supply pipe between the outlet port of the water heat exchanger and the upper part of the hot-water storage tank.

The high energy-efficiency heat pump circuit is operated by utilizing a low-cost nighttime electric power, to gradually heat up water to a predetermined temperature of hot water by circulating water in the hot-water storage tank by means of the circulating pump. Upon detecting by a temperature sensor that the water temperature has reached the predetermined hot water temperature, the operation of the heat pump circuit is stopped.

When using the hot water at a using end unit in the daytime, the hot water is supplied after lowering to an appropriate temperature by mixing, by a mixing valve, water and the hot water taken out at the upper part of the hot-water storage tank.

It is also described that, when the temperature of the hot water in the hot-water storage tank has dropped, the hot water in the hot-water storage tank is reheated at the water heat exchanger and the heater and supplied to the using end unit notwithstanding the hot water discharge channel is not described in detail.

However, considering that a bathtub is filled with the hot water from the hot-water storage tank, the required capacity of the hot-water storage tank is as close to 200 liters as the bathtub. Furthermore, where it is expected to allow a certain amount of room for use of the hot water for other purposes, the tank capacity in some cases will become as large as 500 liters. When the hot-water storage tank is filled up to its full capacity, the mass will exceed 200 kg to 500 kg. The heat pump hot-water supply system, therefore, needs the construction of a firm, substantially wide ground foundation for installation.

Furthermore, a great deal of energy is required to heat up a large quantity of hot water. In addition, storing water at high temperatures results in a substantial difference between the hot water temperature and the outside air temperature and therefore in a big heat loss by heat dissipation, consequently requiring the use of an excess energy.

The heat pump hot-water supply system, therefore, can not be installed in such a narrow space or a low-strength place as the balcony of an apartment house or a condominium.

The conventional heat pump hot-water supply system is basically operated by utilizing a nighttime low-cost electricity rate as follows. During the nighttime the heat pump circuit is operated to store the hot water in the hot-water storage tank. During the daytime the heat pump circuit is not operated and the hot water held in the hot-water storage tank is used. According to this unit, however, the hot water in the hot-water storage tank is sometimes used up; in such a case, water can not be heated instantly, resulting in hot water starvation. In the above-described heat pump hot-water supply system disclosed in Japanese Patent Laid-Open No. 1997(H9)-126547 also, the hot water is held by utilizing the nighttime electric power as in the case of the electric water heater, and additional heating is performed in the case of lack of hot water. The additional heating, therefore, is a supplementary operation.

Furthermore, heat is dissipated out from the surface of the hot-water storage tank which stores a large quantity of hot water of higher temperatures than the outside air temperature, resulting in waste of energy and a drop of temperatures. It is, therefore, necessary to heat an excess amount of water up to the same temperature as the temperature drop during the nighttime.

SUMMARY OF THE INVENTION

The first object of this invention is to provide a hot-water supply system which needs a narrow mounting space, and has a small mass and a good energy efficiency.

The second object of this invention is to provide a hot-water supply system which can decrease the length of time for the stabilization of hot-water temperature when the hot water is supplied from the hot-water supply system which needs a narrow mounting space and has a small mass.

The third object of this invention is to provide a hot-water supply system which needs a narrow mounting space and has a small mass, and allows additional heating of the bath water.

The above objects can be accomplished by the provision of a heat pump hot-water supply system which has an operation mode to supply water fed in through a water supply pipe to a using end unit via a first heat exchanger, and is comprised of a compressor, the first heat exchanger for heat exchange between a refrigerant discharged from the compressor and water, a pressure reducing unit for reducing the pressure of the refrigerant from the first heat exchanger, a second heat exchanger located between the pressure reducing unit and the compressor, a hot-water supply tank for holding water heated by the first heat exchanger, and a water circulating route for followed by water, which is kept in the hot-water supply tank, back to the hot-water supply tank via the first heat exchanger.

The second object of this invention can be accomplished by the provision of a heat pump hot-water supply system which has a mode for mixing water supplied through a water supply pipe via a first heat exchanger with water in a hot-water supply tank and supplying the mixture to a using end unit, and is comprised of a compressor, the first heat exchanger for heat exchange between a refrigerant discharged from the compressor and water, a pressure reducing unit for reducing the pressure of the refrigerant from the first heat exchanger, a second heat exchanger located between the pressure reducing unit and the compressor, the hot-water supply tank for holding water heated by the first heat exchanger, and a water circulating route followed by water, which is kept in the hot-water supply tank, back to the hot-water supply tank via the first heat exchanger.

The above objects can be accomplished by the provision of a heat pump hot-water supply system which has an operation mode for mixing water supplied through a water supply pipe via a first heat exchanger with water in a water supply pipe and supplying the mixture to a using end unit, and is comprised of a compressor, a first heat exchanger for heat exchange between a refrigerant discharged from the compressor and water, a pressure reducing unit for reducing the pressure of the refrigerant from the first heat exchanger, a second heat exchanger located between the pressure reducing unit and the compressor, a hot-water supply tank for holding water heated by the first heat exchanger, and a water circulating route followed by water, which is kept in the hot-water supply tank, back to the hot-water supply tank via the first heat exchanger.

The second object of this invention can be accomplished by the provision of a heat pump hot-water supply system which has a mode for mixing water supplied through a water supply pipe via a first heat exchanger with water in the hot-water supply tank and further mixing with water supplied from a water supply pipe and then supplying the mixture to a using end unit, and is comprised of a compressor, a first heat exchanger for heat exchange between a refrigerant discharged from the compressor and water, a pressure reducing unit for reducing the pressure of the refrigerant from the first heat exchanger, a second heat exchanger located between the pressure reducing unit and the compressor, the hot-water supply tank for holding water heated by the first heat exchanger, and a water circulating route followed by water, which is kept in the hot-water supply tank, back to the hot-water supply tank via the first heat exchanger.

The third object of this invention can be accomplished by the provision of a heat pump hot-water supply system which has a reheating mode for circulating water from the bathtub back to the bathtub via the first heat exchanger, and is comprised of a compressor, a first heat exchanger for heat exchange between a refrigerant discharged from the compressor and water, a pressure reducing unit for reducing the pressure of the refrigerant from the first heat exchanger, a second heat exchanger located between the pressure reducing unit and the compressor, a hot-water supply tank for holding water heated by the first heat exchanger, and a water circulating route followed by water, which is kept in the hot-water supply tank, back to the hot-water supply tank via the first heat exchanger.

The above object can be accomplished by the provision of a heat pump hot-water supply system which has a hot-water supply tank capacity of 60 liters to 100 liters, and is comprised of a compressor, a first heat exchanger for heat exchange between a refrigerant discharged from the compressor and water, a pressure reducing unit for reducing the pressure of the refrigerant from the first heat exchanger, a second heat exchanger located between the pressure reducing unit and the compressor, a hot-water supply tank for holding water heated by the first heat exchanger, and a water circulating route followed by water, which is kept in the hot-water supply tank, back to the hot-water tank via the first heat exchanger.

The above object can be accomplished by the provision of a heat pump hot-water supply system which has a hot-water tank capacity of 60 liters to 100 liters, and is comprised of a compressor, a first heat exchanger for heat exchange between a refrigerant discharged from the compressor and water, a pressure reducing unit for reducing the pressure of the refrigerant from the first heat exchanger, a second heat exchanger located between the pressure reducing unit and the compressor, a hot-water supply tank for holding water heated by the first heat exchanger, and a water circulating route followed by water, which is kept in the hot-water supply tank, back to the hot-water tank via the first heat exchanger. In the unit, the compressor, the first heat exchanger, the second heat exchanger, the pressure reducing unit, and the hot-water supply tank are housed in one casing.

The above object can be accomplished by the provision of a heat pump hot-water supply system which has a hot-water supply tank capacity of 60 liters to 100 liters, and is comprised of a compressor, a first heat exchanger for heat exchange between a refrigerant discharged from the compressor and water, a pressure reducing unit for reducing the pressure of the refrigerant from the first heat exchanger, a second heat exchanger located between the pressure reducing unit and the compressor, a hot-water supply tank for holding hot water heated by the first heat exchanger, and a water circulating route followed by water, which is kept in the hot-water supply tank, back to the hot-water supply tank via the first heat exchanger. In the unit, the compressor, the first heat exchanger, the second heat exchanger, the pressure reducing unit, and the hot-water supply tank are housed in one casing, and the hot-water tank is mounted in the upper part of the casing.

DESCRIPTION OF THE PREFERRED EMBODIMENTS

Figure 1:
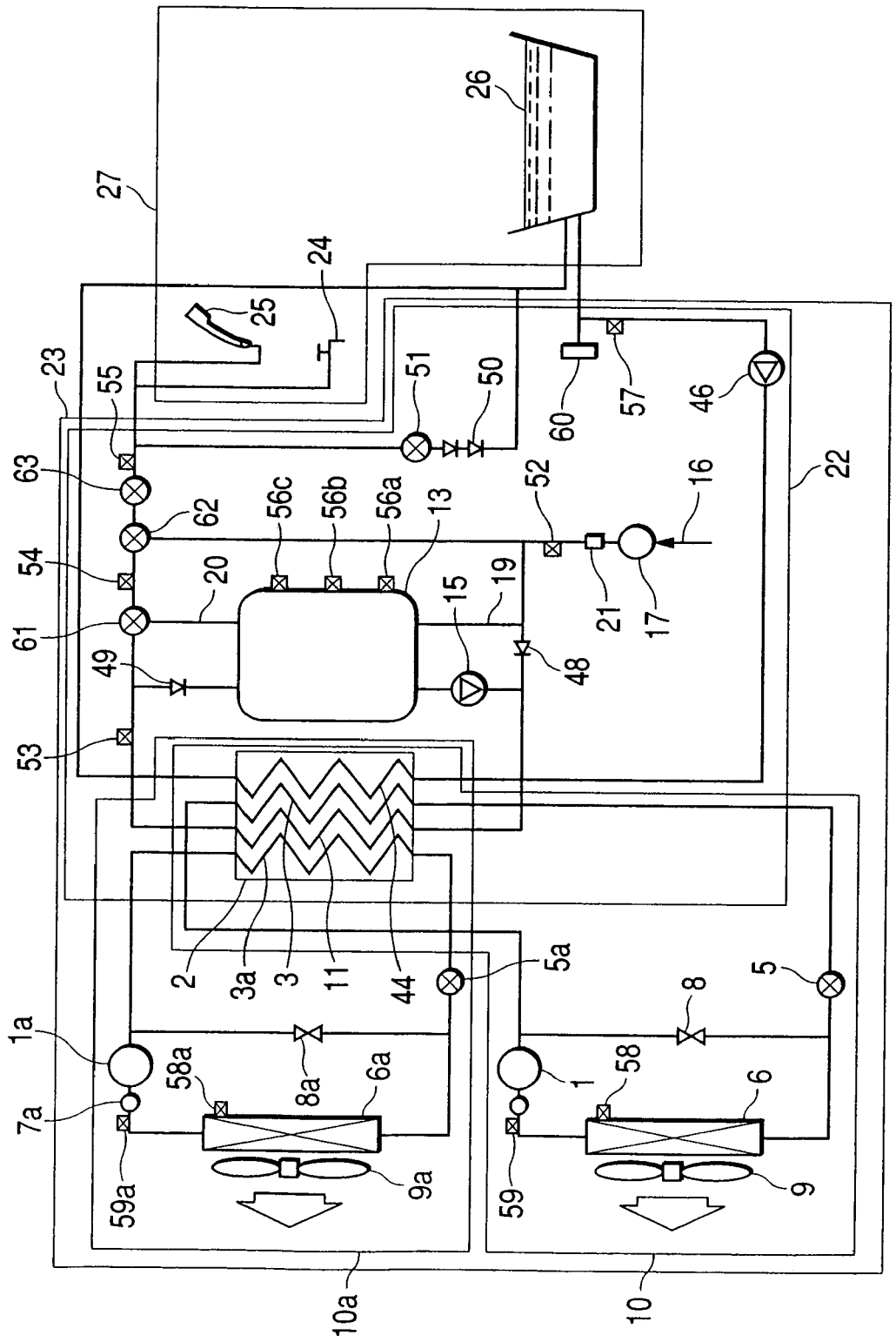
FIG. 1 shows one example of a heat pump circuit and a water circuit of a heat pump hot-water supply system according to this invention.

An example of a heat pump hot-water supply system tank will be explained with reference to the accompanying drawings. FIG. 1 shows one example of the heat pump hot-water supply system according to this invention.

First, a refrigeration cycle will be described. The refrigeration cycle includes two heat pump circuits: one is a heat pump circuit 10 in which equipment constituting the refrigeration cycle are connected by a refrigeration pipe, through which the equipment are filled with the refrigerant and hermetically sealed, and the other is a heat pump circuit 10a added to realize a maximum capacity necessary for supplying hot water. In the present example, two heat pump circuits are adopted to constitute the hot-water supply system. In this case, either one circuit or three or more circuits may be used in accordance with the performance of the compressor and the heat exchanger and the hot-water supplying capacity.

The refrigerant ($CO_2$) compressed by compressors 1 and 1a flows into a heat exchanger 2. In the heat exchanger 2 are integrally installed condensers 3 and 3a for condensing the refrigerant, a water heat exchanger 11 for heating the hot water, and further a bath water heat exchanger 44. The refrigerant that has flowed out of the heat exchanger 2 is reduced in pressure by the action of pressure reducing units 5 and 5a, becoming a low-temperature, low-pressure refrigerant. Then, at evaporators 6 and 6a, the refrigerant absorbs heat from the outside air drawn in by blowers 9 and 9a, being drawn again into the compressors 1 and 1a through accumulators 7 and 7a.

Numerals 8 and 8a denote bypass valves, which are opened to allow the high-temperature, high-pressure refrigerant discharged from the compressors 1 and 1a, into the evaporators 6 and 6a, thereby melting frost (defrost control) which forms on the evaporators 6 and 6a. The timing of the defrost control may be synchronized by simultaneously operating the two refrigeration circuits, and also may be not synchronized. In the case when the defrost control timing is not synchronized, there is the advantage that the hot water can be supplied without interruption notwithstanding a little degradation in capacity.

Next explained is the hot-water circuit of a water circulating circuit 22 which takes water in from a running water pipe 16 and supplies the hot water directly to a using end unit via the heat exchanger 2 or heats up water to a predetermined temperature by circulating water inside as later described.

To the water circulating circuit 22 are connected, by a water pipe, the heat exchanger 2, a pressure reducing check valve 17, a flow sensor 21, check valves 48 and 49, a hot-water supply tank 13, a circulating pump 15, a mixing valve 61 for mixing hot water from a hot-water supply tank 13 with hot water coming out from the water heat exchanger 11, a mixing valve 62 for mixing the hot water from the mixing valve 61 with water, and a flow control valve 63 for controlling the flowrate of the hot water.

The bath water circuit is comprised of the heat exchanger 2, a hot-water supply solenoid valve 51, a check valve 50, a water level sensor 60, and a bath water circulating pump 46.

The heat pump hot-water supply system of the present example is a compact, light-weight hot-water supply system which, unlike conventional system, uses no large-sized hot-water tank. That is, an instantaneous hot-water supply system is adopted, in which water is heated by heat exchange at the water heat exchanger 11 between the high-temperature refrigerant in the heat pump circuit 10 and water in the water circulating circuit 22; water led in through the water supply pipe 16 is heated by the water heat exchanger 11; and the hot water is supplied to a using end unit 27. It is, therefore, possible to eliminate the need for the use of a conventional large-sized hot-water tank. Sufficient heat of condensation to heat water can not be produced, because pressure conditions of the heat pump circuit 10 is not stabilized just after the start of operation. Therefore, during a short period of rising time, a mixture of hot water held in the hot-water tank 13 and water from the water heat exchanger 11 is supplied, thereby enabling the downsizing of the hot-water supply tank 13 while keeping on the preset temperature. When the operation of the heat pump circuit 10 has stabilized and the hot water has been heated up to the preset temperature, the use of the hot water from the hot-water tank 13 is stopped and the direct supply of the hot water is started. The operation will be described in detail below.

Water supply to the heat pump hot-water supply system will be explained. Water supplied from the water supply pipe 16 flows into the pressure-reducing check valve 17, where the water pipe is branched off into two lines: one for supplying the hot water into the hot-water supply tank 13 through the water supply pipe 19 and the other for supplying the hot water into the heat exchanger 2 through a water pipe connected to the water head exchanger 11. The hot water to be supplied to the using end unit 27 is supplied at a preset temperature through the mixing valves 61 and 62 and the flow control valve 63.

The heat pump hot-water supply system stated in the present example is assumed to be an instantaneous water heater which raises temperature of water supplied from the water supply pipe 16 to a user's set value by means of the heat exchanger 2, supplying the hot water to the using end unit 27. Therefore, in the case of a high refrigeration cycle capacity, or in the case of high performance of the water heat exchanger 11, there is no necessity to provide the hot-water supply tank 13. It is, therefore, possible to build a considerably more compact, more advantageous hot-water supply system than the conventional electric water heater which is heavy and requires a wide mounting space.

There is such a case, however, that the temperature of the hot water will not reach the preset temperature for the reason that the heat exchanger 2 is not fully heated because of low water supply temperatures and unstable refrigeration cycle.

In the present example, the hot-water supply tank 13 with the minimum necessity is installed; and the hot water held as supplement in the hot-water supply tank 13 is used until the temperature of water from the heat exchanger 2 reaches the preset value, to thereby ensure the hot-water temperature at the using end unit 27.

Therefore, it is conceivable that the temperature of the hot water from the heat exchanger 2 will not rise. In this case, the hot water is held at the predetermined temperature in the hot-water supply tank 13 in the case when the use of the hot water at the using end unit 27 is interrupted, so that the hot water for subsequent use can be supplied at the preset temperature. The operation of each section will gradually become clearer from the following description.

The mixing valve 61, as described above, has a function to supply to the using end unit 27 the hot water subsidiarily mixed to reach a preset temperature in the hot-water supply tank 13 when the temperature of the hot water from the heat exchanger 2 (the water heat exchanger 11) does not fully rise immediately after the start of heat pump circuit operation. The mixing valve 61 and the hot-water supply tank 13 are connected by a hot-water supply pipe 20.

The mixing valve 62 functions to mix the hot water supplied from the mixing valve 61 with water supplied through the water supply pipe 16 when the temperature of the hot water exceeds the preset value, thereby lowering the hot-water temperature to the preset value.

Furthermore, the flow control valve 63 is a valve which functions to control the flowrate so that the quantity of the hot water to be supplied will not exceed the total quantity expected.

In each section are placed a water supply temperature sensor 52, a water heat exchanger outlet water temperature sensor 53, a water temperature sensor 54 for measuring the temperatures of a mixed hot water in the hot-water supply tank and water at the water heat exchanger outlet, a hot-water supply temperature 55 for measuring the temperature of hot water finally supplied, and a tank temperature sensor 56 (*a, b, c*) for measuring the residual quantity of hot water in the hot-water supply tank 13. On the refrigeration cycle side are placed evaporator temperature sensors 58, 58*a* for measuring the intermediate temperature of the evaporators 6, 6*a*, and suction temperature sensors 59, 59*a* for sensing the suction temperature of the compressor 1.

The heat pump circuits 10, 10*a*, the water circulating circuit 22 including the hot-water supply tank 13, and other equipment are housed in a later-described casing 23.

As the using end units 27, the hot-water supply system is provided with a faucet 24 in a kitchen or other, a shower 25 in a bathroom, and a bathtub 26 separated by the hot-water supply solenoid valve 51 and the check valve 50. The check valve 50 is used for hygienic reasons to prevent mixing of hot water supplied from the water supply pipe 16 with hot water in the bathtub 26. In the present example, a terminal for water use is added to each using terminal as occasion demands unless otherwise described.

The heat pump hot-water supply system according to the present example has the above-described constitution and operates as explained below. The heat pump hot-water supply system is said to have a 300 to 500% higher energy efficiency as compared with the electric water heater, and utilizes the heat pump circuit 10, like an instantaneous hot-water heater, to directly supply hot water to the using end unit 27. As previously explained, however, the heat pump circuit 10 can not fully supply the heat of condensation needed for heating water at the water heat exchanger 11 during a period immediately after the start of operation till the stabilization of heat pump circuit operation. Accordingly hot water can not be supplied directly to the using end unit 27. In the heat pump hot-water supply system of the present example, a period of several minutes of rising is utilized for subsidiarily supplying high-temperature water held in a small-capacity hot-water supply tank 13.

First, the capacity of the hot-water supply tank 13 will be explained. With an extreme case excluded, 11.8 liters/min. of water is needed for a shower for general home use; 8.5 liters/min. for the kitchen; and 7.5 liters/min. for the lavatory. The hot-water supply tank 13 is continuously usable for 9.7 min. for the shower, and for 13.4 min. for the kitchen. When the simultaneous use is not taken into account, the continuously usable necessary quantity of hot water is about 114 liters. Presume that the temperature of hot water to be supplied is 40° C., the temperature of hot water held in the hot-water supply tank 13 is 60° C. at which salmonellas can not live, and the temperature of water to be supplied from the heat exchanger 2 is 8° C. with the worst condition taken into account. The computed quantity of hot water to be held in the hot-water supply tank 13 under these conditions is about 70 liters. However, since it is not conceivable that water to be supplied from the heat exchanger 2 always remains at the temperature of 8° C., the water temperature should be set at 18° C., i.e. 10° C. higher than the presumed temperature, so that the hot-water supply tank 13 having the capacity of 60 liters will be sufficient.

Furthermore, supposing that the size of an outdoor unit of a commercial packaged air conditioner currently on the market is an allowable size for a household hot-water supply equipment, the equipment is 1400 mm high, 900 mm wide, and 300 mm deep. When the hot-water supply tank 13 is of a cylindrical shape and housed inside of the casing of the outdoor unit, the maximum permissible size is 300 mm in diameter of the hot-water supply tank 13, and 1400 mm in height. The capacity of the tank is 0.1 cubic meter (100 liters).

From the above description, it can be summarized such that a desirable range of the hot-water storing capacity of the hot-water supply tank 13 is 60 liters to 100 liters. When the hot-water storing capacity of the hot-water supply tank 13 is set within the range stated above, an outdoor unit such as the packaged air conditioner and the room air conditioner can be housed in one casing within the scope that the use of hot water will not be interfered with. That is, the hot-water supply tank 13 can be housed, together with such major components as the compressor 1, the exterior heat exchanger 6, the water heat exchanger 11, and the pressure reducing unit 5, in one casing.

In the refrigeration cycle using the CFCs refrigerant, approximately the highest heating temperature is 60° C. The water temperature can be further increased by using $CO_2$, and therefore the hot-water storing capacity of the hot-water supply tank 13 may be decreased by that increase in the water temperature.

In the case when a using end unit used is other than the bath 26, the flowrate sensor 21 senses the use of the terminal, starting the compressor 1 to start the operation of the heat pump circuit 10. At the initial stage of operation, the heat pump circuit 10 is still in the state of rising, performing hot-water supplying operation utilizing the hot-water supply tank 10. Water supplied through the water supply pipe 16 flows into the lower part of the hot-water supply tank 13 via the pressure reducing valve 17 and the water supply pipe 19. The hot-water supply tank 13 supplies water from its lower part; high-temperature water present in the upper part in the hot-water supply tank 13 is forced out by the water pressure into the hot-water supply pipe 20.

On the other hand, water from the water supply pipe 16 flows into a water circuit connected to the water heat exchanger 11 to thereby heat water by the refrigeration cycle 10. The hot water from the hot-water supply tank 13 and the hot water from the water heat exchanger 11 are mixed by the mixing valve 61, at which the temperature of the hot water is sensed by the water temperature sensor 54, controlling the quantity of the hot water from the hot-water storage tank 13 and the quantity of water heated by the refrigeration cycle 10 and fed out of the water heat exchanger 11 to thereby adjust the hot water temperature to the preset value. During the initial period of operation, water passing through the water heat exchanger 11 is not sufficiently heated, and therefore the hot water is supplied mostly from the hot-water supply tank 13. Therefore, a little quantity of water is flowing in the water heat exchanger 11 (a mixture operation mode). At this stage of initial operation, the temperature of the hot water can be quickly raised by thus decreasing the quantity of water flowing in the water heat exchanger 11.

In the mixture operation mode, when the hot-water temperature at the using end unit 27 is too high (over the preset value), the mixing valve 62 is opened to mix water from the water supply pipe 16, thus controlling the hot-water temperature.

As the operation is kept on, the heat pump circuit 10 is gradually stabilized; the temperature of hot water from the water heat exchanger 11 rises high; and the mixing valve 61 which mixes the hot water from the water heat exchanger 11 with the hot water from the hot-water supply tank 13 gradually reduces the hot water being fed from the hot-water supply tank 13 until the temperature of hot water from the water heat exchanger 11 reaches the preset value. Thus, the supply of hot water from the hot-water supply tank 13 is fully stopped, so that only the hot water that has passed through the water heat exchanger 11 after heating at the heat pump circuit 10 may be supplied (instantaneously heating mode).

To supply the hot water at the preset temperature to the using end unit, the water temperature is sensed by the temperature sensor 55, and the hot water that has come out of the water heat exchanger 11 and passed the mixing valve 61 and water bypassed are mixed by the mixing valve 62, from which the hot water is supplied at the preset temperature to the using end unit. When the temperature of water supplied from the water supply pipe 16 is high especially in the summer season, the temperature of hot water outputted from the water heat exchanger 11 tends to rise higher than the preset temperature. At this time, therefore, the mixing valve 61 is controlled to appropriately mix water to supply the hot-water temperature at the preset value to the using end unit (water mixing mode).

When an inverter control capable of controlling the speed of the compressor 1 is adopted in the refrigeration cycle 10, the hot-water temperature at the water heat exchanger 11 is sensed by means of the temperature sensor 53, thereby controlling the speed of the compressor 1 to obtain the preset water temperature.

Furthermore, in the refrigeration cycle 10 itself an expansion valve 5 is provided for adjustment to gain a constant difference between a temperature sensor 58 located on the way of the evaporator 6 and a compressor suction temperature sensor.

Then, when the using end unit is closed, the flowrate sensor 21 senses the closing of the terminal. When the water temperature in the hot-water supply tank 13 is below the preset value, the hot-water supply tank 13 starts additional heating operation.

To perform the additional heating of the hot-water supply tank, the pump 15 is operated after waiting until the water heat exchanger outlet temperature reaches a high temperature (hot-water storage temperature) while operating the refrigeration cycle 10. Therefore water present in the lower part of the hot-water supply tank 13 goes into the water heat exchanger 11, where water is heated to high temperature, then returning to the upper part in the hot-water supply tank 13 via the check valve 49. The check valve 49 checks the flow of the hot water out of the hot-water supply tank 13 when the mixing valve 61 is fully closed during the above-described normal supply of hot water.

The temperature at the outlet of the water heat exchanger at this time is controlled by changing the speed of the compressor 1 and the flowrate of water in the circulating pump 15. The tank temperature sensor 56 senses the completion of heating of the hot-water in the hot-water supply tank; thus the additional heating of the hot-water supply tank 13 is finished, setting the hot-water supply system to the standby state.

The hot water is supplied from the hot-water supply tank 13 to the using end unit by supplying water from the water supply pipe 16. The hot-water supply tank is kept full of water and accordingly, in principle, the quantity of hot water in the hot-water supply tank 13 will not decrease. The hot-water supply tank 13 is drained at the time of completion of installation or a long-time shutdown; therefore no water is present in the hot-water supply tank 13 when operation is restarted. When restarting operation of the tank, it is necessary to supply water. In this case, if the shower 25 or the faucet 24 of the using end unit 27 is opened, water from the water supply pipe 16 flows to the using end unit 11 via the water heat exchanger 11. At this time, the hot water supply temperature sensor 55 detects a low temperature. The mixing valve 62, therefore, opens only to the hot-water side (no water from the water supply pipe 16 is mixed). Since the detected value of the hot-water supply temperature sensor 54 indicates a low temperature, the mixing valve 61 opens to mix the hot water from the water heat exchanger 11 with water from the hot-water supply tank 20. However, because the hot-water supply tank 13 is not yet full of water, no water will be supplied from the hot-water supply tank 13 through the mixing valve 61. Then, the mixing valve 61 on the hot-water supply tank 13 is also opened to bleed air; therefore water from the water supply pipe 16 flows into the water heat exchanger 11 and also into the hot-water supply tank 13. The faucet of the using end unit 27 is closed when the hot-water supply tank 13 is filled to capacity, the additional heating of the hot-water supply tank 13 is started.

The refrigeration cycle 10 will still have both the maximum and minimum capacities if the compressor 1 equipped with an inverter is adopted. Capacity required for supplying hot water can be estimated by the water supply temperature sensor 52, the flowrate sensor 21, and the set temperature of hot water to be supplied.

When the required hot-water supply capacity is under the minimum capacity, the refrigeration cycle 10 is not operated, but the same circuit as during the normal supply of hot water (an operation circuit for mixing hot water (water) from the water heat exchanger 11 with hot water from the hot-water supply tank 13) is used to supply hot water at the preset temperature only from the hot-water supply tank 13. When the remaining quantity of hot water in the tank has decreased (low hot-water temperature), the additional heating of the tank is performed to add hot water to the tank.

An instantaneous water-heater tank such as a gas hot-water supply system is not equipped with an auxiliary tank, and therefore can not supply hot water at the minimum capacity or less (a mixing valve at the using end unit is used to adjust hot-water temperatures). In the present embodiment, the heat pump hot-water supply system has the hot-water supply tank 13; therefore in such a case also it is possible to supply hot water at the preset temperature to the terminal.

In the case when the hot-water supply capacity has exceeded the maximum capacity of the refrigeration cycle 10, the flow control valve 63 is operated to reduce the flowrate, thereby supplying hot water at the preset temperature.

Generally, the heat pump hot-water supply system utilizes the nighttime electric power. In the case of a hot-water supply system with a 300-liter or larger tank, it is required to heat and hold hot water at 70° C. to 90° C. Since the water is required to be heated at high temperatures, a heat efficiency is lowered. According to the present invention, however, the water is heated at the temperature (e.g. 42° C. in general use) required by the terminal, and therefore its heat efficiency becomes very high as compared with other heat pump hot-water supply systems.

When putting hot water in, or filling up, the bathtub 26, the same operation as the hot-water supply operation is done: opening the hot-water supply solenoid valve 51 to fill up the bathtub 26. In case the supply of hot water to the bathtub 26 is stopped, it is conceivable that the hot water flows back from the bathtub 26. To prevent this, the check valve 50 is provided for hygienic reasons.

The bathtub 27 requires over 180 liters of hot water to be filled up. This hot-water supply operation, therefore, may be altered to the following operation. That is, during the initial period of operation, water may be supplied directly from the water heat exchanger 11 by operating the heat pump circuit 10 without using hot water in the hot-water supply tank 13. It is because over 180 liters of hot water is needed to fill up the bathtub 26, and the rising time of the refrigeration cycle 10 is little on the whole. The water level in the bathtub 26 is monitored by means of the water level sensor 60, and therefore when the water has reached the preset water level, the supply of hot water to the bathtub, or filling up operation, will stop.

Next, the additional heating of the bath will be explained. In the case when the bathtub 26 using the same hot-water heater as conventional ones is already filled up and needs to be heated, an electric hot-water heater with a large tank filled up with water can not heat the water in the bathtub.

According to the present example, however, the heat exchanger 2 integrally incorporates the condenser 3 for refrigerant condensation, the water heat exchanger 11 for heating the water, and the bathtub water heat exchanger 44. Therefore, the water in the bathtub can be heated by operating the heat pump circuit 10 and the circulating pump 46 to recirculate the water filled up in the bathtub 26. That is, the water filled up in the bathtub 26 is sent to the bathtub water heat exchanger by means of the circulating pump 46, being heated up and flowing back to the bathtub 26. A bath water temperature sensor 57 for detecting the water temperature in the bathtub is mounted at the upstream side of the bathtub water heat exchanger 44. When the detected value of the sensor 57 has reached the preset temperature, the heat pump circuit (mainly the compressor 1) and the circulating pump 46 are stopped. That is, the heat pump hot-water supply system has an automatic function to automatically keep the preset temperature of hot water in the bathtub.

As heretofore described, the heat pump hot-water supply system of this invention has various automatic bath functions such as the supply or filling up of hot water to the bathtub 26 and water heating. That is, it is possible to add hot water and also to additionally heat bath water.

Figure 2:
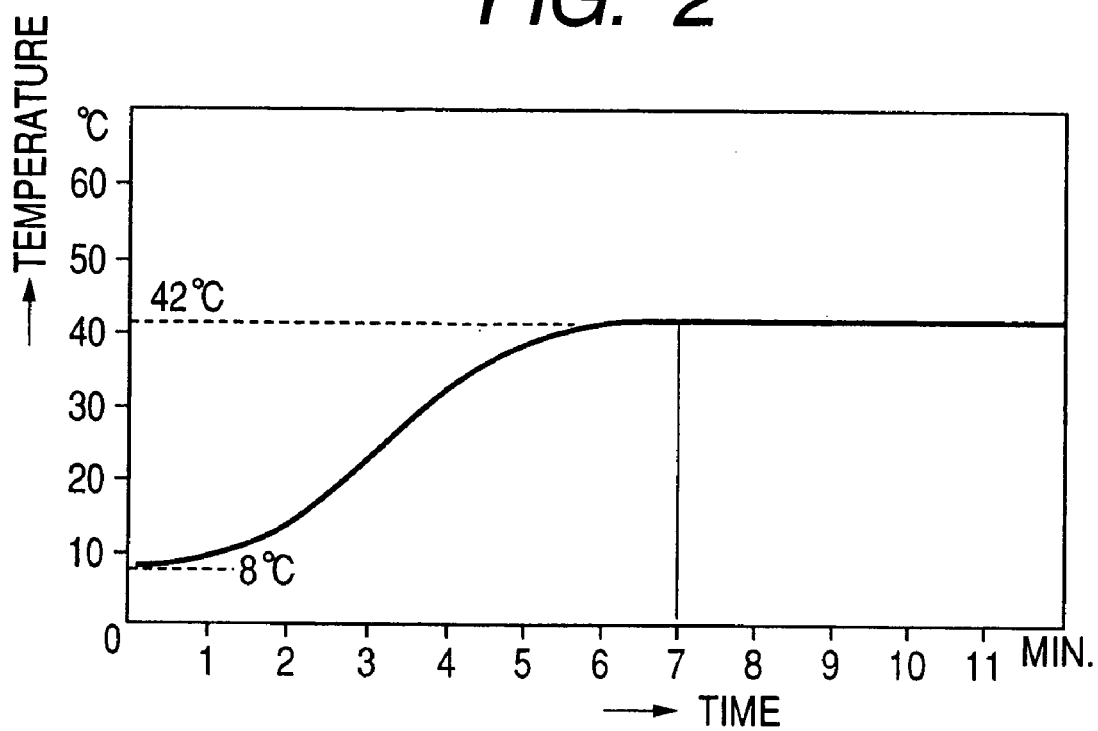
FIG. 2 is a graph showing a characteristic curve of water temperature and time after the start of heat pump circuit operation.

FIG. 2 is a graph showing a characteristic curve obtained by experimenting a relationship between time and water temperature during the initial transient period of operation.

The temperature and quantity of hot water used at a using end unit for home use are said to be about 40 to 42° C. and 6 to 8 liters/min. At the experiments conducted with outside air conditions in the winter season as well as these temperatures and quantities of hot water taken into account, the temperature of hot water to be supplied was set at 8° C.

The graph shows a change in water temperature at the outlet of the water heat exchanger 11 when water is supplied to the water heat exchanger 11 simultaneously with the operation of the heat pump circuit 10. From this characteristic curve it is understood that it takes about 7 minutes from the start of water supply at the temperature of 8° C. at the inlet of the water heat exchanger 11 till the hot-water temperature reaches 42° C. at the outlet of the water heat exchanger 11.

Generally one can not keep on waiting for 7 minutes with patience until the hot water temperature rises at the faucet 24 of a kitchen or the shower 25.

In the present example, based on the experiments, an about 30-liter small-capacity hot-water supply tank 13 (actually, 90 liters to allow room) is provided, in which about 60° C. hot water is stored.

At the using end unit, the 60° C. hot water is added with 8° C. running water supplied from the water heat exchanger 11 to lower the water temperature to 42° C. as the initial value. Therefore, even if the temperature of water from the water heat exchanger 11 remains at 8° C., 30 liters of 60° C. hot water is sufficient for five minutes. Furthermore, the hot-water tank of this size can be integrally housed in the heat pump circuit casing, and therefore does not require a wide mounting space unlike the conventional heat pump hot-water supply system. Besides, the hot-water tank, having a small mass, requires no firm ground, and therefore can be mounted on the balcony of an apartment house or a condominium.

Next, the mounting position of the hot-water supply tank 13 will be explained. A conceivable mounting position of the hot-water supply tank 13 is under the heat pump circuit 10 as shown in FIG. 3, on the heat pump circuit 10 as shown in FIG. 4, or beside the heat pump circuit 10 as shown in FIG. 5.

Figure 3:
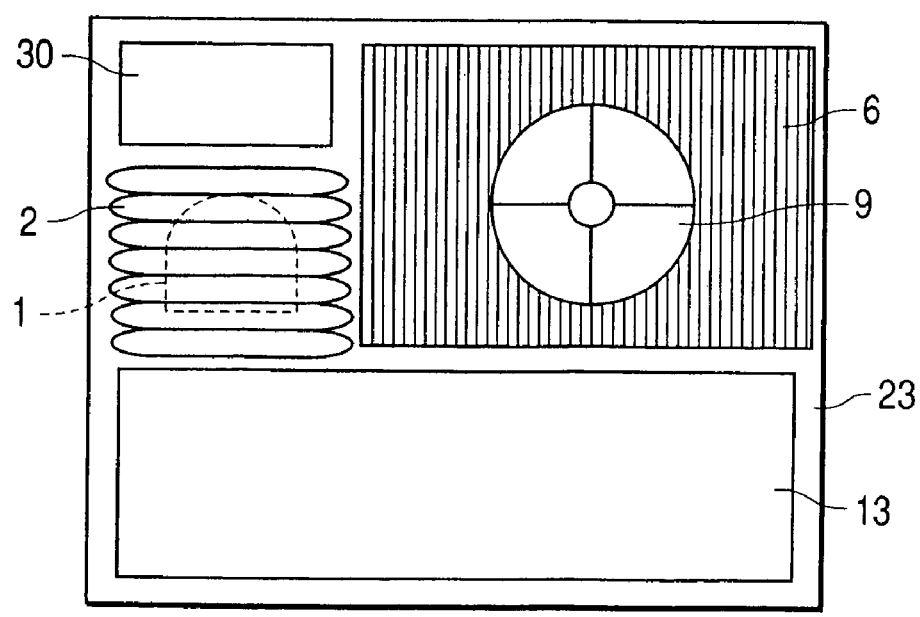
FIG. 3 is a block diagram showing a hot-water tank incorporated in the lower part of the heat pump circuit.
Figure 4:
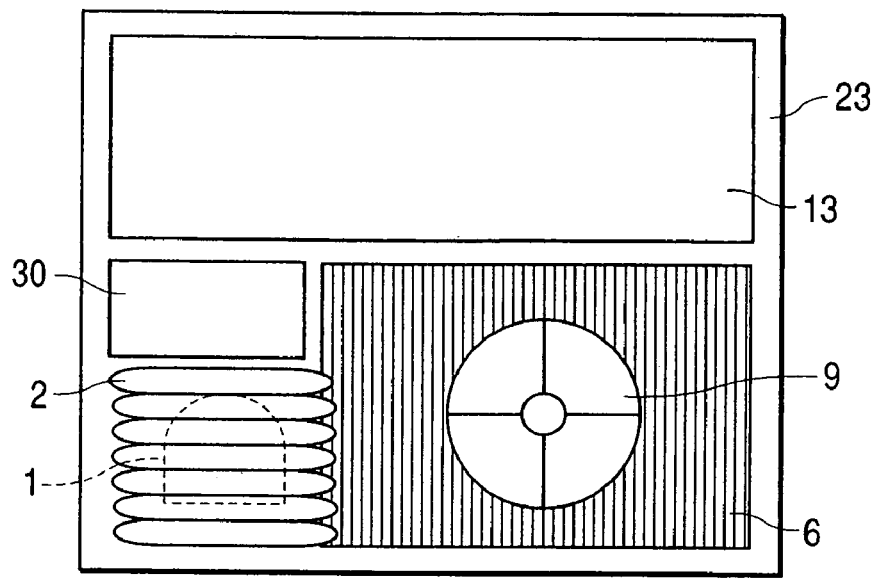
FIG. 4 is a block diagram showing the hot-water tank incorporated in the upper part of the heat pump circuit.

The hot-water supply tank 13 filled with water is mounted under the heat pump circuit 10 as shown in FIG. 3, that is, is located in the lower part of the casing; therefore the heat pump hot-water supply system ensures improved stability. Furthermore, in the manufacturing process also, equipment can be mounted in order on the top of the hot-water supply tank 13, resulting in improved operation performance and further in improved serviceability because interior equipment can be checked easily by removing the casing 23. Numeral 30 refers to a control circuit, which controls the compressor 1, the pressure reducing unit 6, various mixing valves, and the blower 9 in accordance with the output of sensors thereof. The above description is similarly applicable to the following drawings.

However, the hot-water supply tank filled with hot water, when mounted in the lower part of the casing, tends to dissipate heat from the surface of the hot-water supply tank 13 because it is located close to the ground, excessively wasting an energy. To cope with this drawback, the hot-water supply tank 13 is mounted on the heat pump circuit 10 as shown in FIG. 4, to thereby slightly sacrifice assembly operation efficiency and serviceability. In this case, the hot-water supply tank 13 is surrounded with heat produced by the heat pump circuit 10; therefore it is possible to decrease the excess dissipation of heat from the hot-water supply tank 13.

Figure 5:
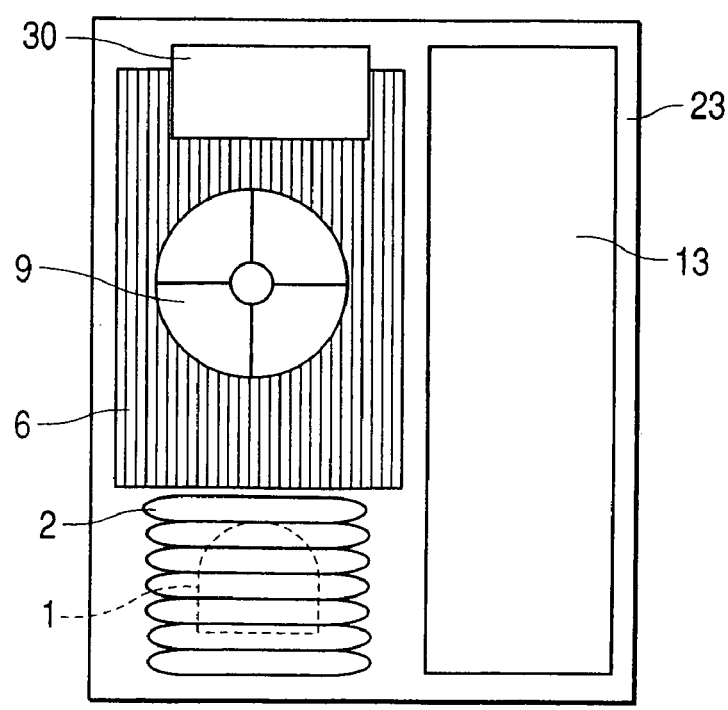
FIG. 5 is a block diagram showing the hot-water tank mounted beside the heat pump circuit.

Furthermore, the hot-water supply tank 13 is mounted beside the heat pump circuit 10 as shown in FIG. 5, serving the purpose for reducing the excess amount of heat dissipation from the tank 13 while ensuring assembly operation efficiency and serviceability.

Figure 6:
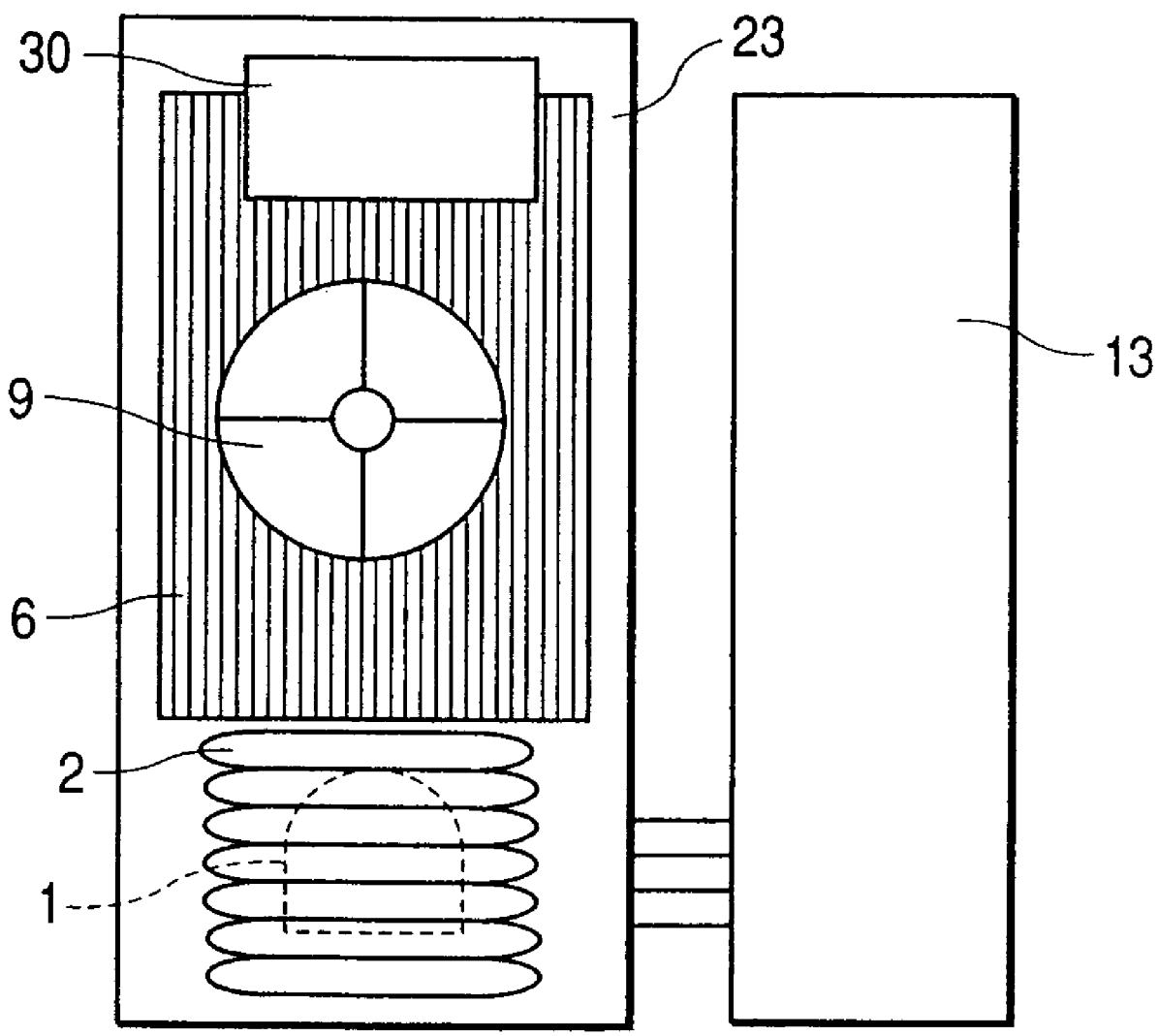
FIG. 6 is a block diagram showing the hot-water tank separately mounted outside of the heat pump circuit body.

Furthermore as shown in FIG. 6, the hot-water supply tank 13 is not integrally housed in the casing, but may be mounted beside the casing in which the heat pump circuit 10 is housed. In this case, a plumbing system for supplying hot water is separated from the heat pump circuit 10 related to the refrigerant. Accordingly, parallel production of their products becomes possible, thus improving products production efficiency, facilitating installation of the products because of separate performance of work, and improving serviceability.

According to the present invention, it is possible to provide a hot-water supply system which needs a narrow mounting space, and has a small mass and a good energy efficiency.

Also, according to the present invention, it is possible to provide a hot water supply system which can decrease the length of time for stabilization of hot-water temperature when the hot water is supplied from the hot-water supply system which needs a narrow mounting space and has a small mass.

And according to the present invention, it is possible to provide a hot-water supply system which needs a narrow mounting space and has a small mass, and allows additional heating of the bath water.

What is claimed is:

1. A heat pump hot-water supply system, comprising:
   a heat pump circuit comprising a compressor,
   first heat exchanger for heat-exchange between a refrigerant discharged from the compressor and water withdrawn from a running water pipe,
   pressure reducing unit for reducing the pressure of the refrigerant from the first heat exchanger,
   second heat exchanger located between the pressure reducing unit and the compressor;
   a controller that controls a speed of the compressor based on a temperature of water heat-exchanged with the refrigerant in the first heat exchanger;
   a hot-water supply tank for holding hot water;
   a direct hot-water supply route which can supply hot water directly from the water supply pipe to a using end unit via the first heat exchanger;
   tank supply route which can supply hot water to the using end unit by mixing water from the first heat exchanger with hot water collected in the hot-water supply tank via a first mixing unit; and
   a bypass supply route which can supply water that has bypassed the first heat exchanger and the hot-water supply tank from the water supply pipe to a position downstream of the first mixing unit via a second mixing unit.

2. The heat pump hot-water supply system according to claim 1, wherein the heat pump circuit and the hot-water supply tank are housed in a single casing.

3. The heat pump hot-water supply system according to claim 2, wherein the heat pump circuit is mounted above the hot-water supply tank in the casing.

4. The heat pump hot-water supply system according to claim 2, wherein the heat pump circuit is mounted below the hot-water supply tank in the casing.

5. The heat pump hot-water supply system according to claim 2, wherein the heat pump circuit is mounted beside the hot-water supply tank in the casing.

6. The heat pump hot-water supply system according to claim 1, wherein the heat pump circuit is housed in a single casing.

7. The heat pump hot-water supply system according to claim 6, wherein the hot-water supply tank is mounted beside the casing in which the heat pump circuit is housed.

8. The heat pump hot-water supply system according to claim 1, wherein the heat pump circuit further comprises $CO_2$ as the refrigerant.

9. A heat pump hot-water supply system, comprising:
   a heat pump circuit comprising a compressor, a first heat exchanger for heat-exchange between a refrigerant discharged from the compressor and water withdrawn from a running water pipe, a pressure reducing unit for reducing the pressure of the refrigerant from the first heat exchanger, a second heat exchanger located between the pressure reducing unit and the compressor;
   a controller that controls a speed of the compressor based on a temperature of water heat-exchanged with the refrigerant in the first heat exchanger and a preset target temperature for the temperature of the hot-water desired at the using end unit;
   a hot-water supply tank for holding hot water;
   a direct hot-water supply route which can supply hot water directly from the water supply pipe to a using end unit via the first heat exchanger;
   a tank supply route which can supply hot water to the using end unit by mixing water from the first heat exchanger with hot water collected in the hot-water supply tank via a first mixing unit; and
   a bypass supply route which can supply water that has bypassed the first heat exchanger and the hot-water supply tank from the water supply pipe to a position downstream of the first mixing unit via a second mixing unit.

10. The heat pump hot-water supply system according to claim 9, wherein the heat pump circuit and the hot-water supply tank are housed in a single casing.

11. The heat pump hot-water supply system according to claim 10, wherein the heat pump circuit is mounted above the hot-water supply tank in the casing.

12. The heat pump hot-water supply system according to claim 10, wherein the heat pump circuit is mounted below the hot-water supply tank in the casing.

13. The heat pump hot-water supply system according to claim 10, wherein the heat pump circuit is mounted beside the hot-water supply tank in the casing.

14. The heat pump hot-water supply system according to claim 9, wherein the heat pump circuit is housed in a single casing.

15. The heat pump hot-water supply system according to claim 14, wherein the hot-water supply tank is mounted beside the casing in which the heat pump circuit is housed.

16. The heat pump hot-water supply system according to claim 9, wherein the heat pump circuit further comprises $CO_2$ as the refrigerant.

17. A heat pump hot-water supply system, comprising:
   a heat pump circuit comprising a compressor, a first heat exchanger for heat-exchange between a refrigerant discharged from the compressor and water withdrawn from a running water pipe, a pressure reducing unit for reducing the pressure of the refrigerant from the first heat exchanger, a second heat exchanger located between the pressure reducing unit and the compressor;

a hot-water supply tank for holding hot water;

a direct hot-water supply route which can supply hot water directly from the water supply pipe to a using end unit via the first heat exchanger;

a tank supply route which can supply hot water to the using end unit by mixing water from the first heat exchanger with hot water collected in the hot-water supply tank via a first mixing unit;

a bypass supply route which can supply water that has bypassed the first heat exchanger and the hot-water supply tank from the water supply pipe to a position downstream of the first mixing unit via a second mixing unit;

a first temperature sensor provided between an outlet of the first heat exchanger and an inlet of the first mixing unit;

a second temperature sensor provided between an outlet of the first mixing unit and an inlet of the second mixing unit;

a third temperature sensor provided between an outlet of the second mixing unit and the using end unit;

a controller that controls a speed of the compressor based on an output of the first temperature sensor, controls the first mixing unit based on an output of the second temperature sensor, and controls the second mixing unit based on an output of the third temperature sensor.

18. The heat pump hot-water supply system according to claim 17, wherein the heat pump circuit and the hot-water supply tank are housed in a single casing.

19. The heat pump hot-water supply system according to claim 18, wherein the heat pump circuit is mounted above the hot-water supply tank in the casing.

20. The heat pump hot-water supply system according to claim 18, wherein the heat pump circuit is mounted below the hot-water supply tank in the casing.

21. The heat pump hot-water supply system according to claim 18, wherein the heat pump circuit is mounted beside the hot-water supply tank in the casing.

22. The heat pump hot-water supply system according to claim 17, wherein the heat pump circuit is housed in a single casing.

23. The heat pump hot-water supply system according to claim 22, wherein the hot-water supply tank is mounted beside the casing in which the heat pump circuit is housed.

24. The heat pump hot-water supply system according to claim 17, wherein the heat pump circuit further comprises $CO_2$ as the refrigerant.

25. A heat pump hot-water supply system, comprising:
a heat pump circuit comprising a compressor, a first heat exchanger for heat-exchange between a refrigerant discharged from the compressor and water withdrawn from a running water pipe, a pressure reducing unit for reducing the pressure of the refrigerant from the first heat exchanger, a second heat exchanger located between the pressure reducing unit and the compressor;

a controller that controls a speed of the compressor based on a temperature of water heat-exchanged with the refrigerant in the first heat exchanger;

a direct hot-water supply route which can supply hot water directly from the water supply pipe to a using end unit via the first heat exchanger;

a tank supply route which can supply hot water to the using end unit by mixing water from the first heat exchanger with hot water collected in a hot-water supply tank via a first mixing unit; and a bypass supply route which can supply water that has bypassed the first heat exchanger and the hot-water supply tank from the water supply pipe to a position downstream of the first mixing unit via a second mixing unit.

26. The heat pump hot-water supply system according to claim 25, wherein the heat pump circuit further comprises $CO_2$ as the refrigerant.

27. A heat pump hot-water supply system, comprising:
a heat pump circuit comprising a compressor, a first heat exchanger for heat-exchange between a refrigerant discharged from the compressor and water withdrawn from a running water pipe, a pressure reducing unit for reducing the pressure of the refrigerant from the first heat exchanger, a second heat exchanger located between the pressure reducing unit and the compressor;

a controller that controls a speed of the compressor based on a temperature of water heat-exchanged with the refrigerant in the first heat exchanger and a preset target temperature for the temperature of the hot-water desired at the using end unit;

a direct hot-water supply route which can supply hot water directly from the water supply pipe to a using end unit via the first heat exchanger;

a tank supply route which can supply hot water to the using end unit by mixing water from the first heat exchanger with hot water collected in a hot-water supply tank via a first mixing unit; and a bypass supply route which can supply water that has bypassed the first heat exchanger and the hot-water supply tank from the water supply pipe to a position downstream of the first mixing unit via a second mixing unit.

28. The heat pump hot-water supply system according to claim 27, wherein the heat pump circuit further comprises $CO_2$ as the refrigerant.

29. A heat pump hot-water supply system, comprising:
a heat pump circuit comprising a compressor, a first heat exchanger for heat-exchange between a refrigerant discharged from the compressor and water withdrawn from a running water pipe, a pressure reducing unit for reducing the pressure of the refrigerant from the first heat exchanger, a second heat exchanger located between the pressure reducing unit and the compressor;

a direct hot-water supply route which can supply hot water directly from the water supply pipe to a using end unit via the first heat exchanger;

a tank supply route which can supply hot water to the using end unit by mixing water from the first heat exchanger with hot water collected in a hot-water supply tank via a first mixing unit;

a bypass supply route which can supply water that has bypassed the first heat exchanger and the hot-water supply tank from the water supply pipe to a position downstream of the first mixing unit via a second mixing unit;

a first temperature sensor provided between an outlet of the first heat exchanger and an inlet of the first mixing unit;

a second temperature sensor provided between an outlet of the first mixing unit and an inlet of the second mixing unit;

a third temperature sensor provided between an outlet of the second mixing unit and the using end unit;

a controller that controls a speed of the compressor based on an output of the first temperature sensor, controls the first mixing unit based on an output of the second temperature sensor, and controls the second mixing unit based on an output of the third temperature sensor.

30. The heat pump hot-water supply system according to claim 29, wherein the heat pump circuit further comprises $CO_2$ as the refrigerant.

* * * * *